US012639851B2

(12) United States Patent　　(10) Patent No.:　US 12,639,851 B2
Choi et al.　　(45) Date of Patent:　May 26, 2026

(54) SYSTEM AND METHOD FOR LEARNING TO SYNTHESIZE HAND-OBJECT INTERACTION SCENE

(71) Applicant: Samsung Electronics Co., Ltd., Suwon-si (KR)

(72) Inventors: Hongsuk Choi, Jersey City, NJ (US); Hyun Soo Park, Saint Paul, MN (US); Ibrahim Volkan Isler, Saint Paul, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 18/384,163

(22) Filed: Oct. 26, 2023

(65) Prior Publication Data

US 2024/0354988 A1　　Oct. 24, 2024

Related U.S. Application Data

(60) Provisional application No. 63/460,995, filed on Apr. 21, 2023.

(51) Int. Cl.
G06T 7/73　　(2017.01)

(52) U.S. Cl.
CPC ...... G06T 7/75 (2017.01); *G06T 2207/10024* (2013.01); *G06T 2207/20081* (2013.01); *G06T 2207/20084* (2013.01); *G06T 2207/30196* (2013.01)

(58) Field of Classification Search
CPC ............. G06T 7/75; G06T 2207/10024; G06T 2207/20084; G06T 2207/20081; G06T 2207/30196

USPC .......................................................... 382/153
See application file for complete search history.

(56) References Cited

U.S. PATENT DOCUMENTS

| | | |
|---|---|---|
| 9,881,423 B2 | 1/2018 | Cho et al. |
| 11,158,123 B2 | 10/2021 | Chen |
| 11,514,658 B2 | 11/2022 | Ali et al. |
| 2020/0133388 A1 | 4/2020 | Takemoto |
| 2020/0184721 A1 | 6/2020 | Ge et al. |
| 2021/0256251 A1 | 8/2021 | Lin et al. |

(Continued)

FOREIGN PATENT DOCUMENTS

EP　　4 155 036 A1　　3/2023

OTHER PUBLICATIONS

Hu, Hezhen, et al. "Hand-object interaction image generation." Advances in Neural Information Processing Systems 35 (2022): 23805-23817. (Year: 2022).*

(Continued)

*Primary Examiner* — Jonathan S Lee
(74) *Attorney, Agent, or Firm* — Sughrue Mion, PLLC

(57) ABSTRACT

An computing system includes: receiving an image that captures a hand and an object; estimating a three-dimensional (3D) mesh of the hand based on the image; estimating a two-dimensional (2D) segment of the object based on the image; estimating a 3D feature representing a correlation of the hand and the object, based on the 3D mesh of the hand and the 2D segment of the object; and generating a first set of output parameters for a first 3D query point, based on the 3D feature representing the correlation of the hand and the object.

19 Claims, 8 Drawing Sheets

(56) References Cited

U.S. PATENT DOCUMENTS

| 2022/0075453 A1 | 3/2022 | Huang |
| 2022/0402125 A1 | 12/2022 | Moreno Noguer et al. |

OTHER PUBLICATIONS

Abdelkareem, Youssef. Scene Representations for Generalizable Novel View Synthesis. Diss. University of Waterloo, 2023. (Year: 2023).*

Christen, Sammy, et al. "D-grasp: Physically plausible dynamic grasp synthesis for hand-object interactions." Proceedings of the IEEE/CVF Conference on Computer Vision and Pattern Recognition. 2022. (Year: 2022).*

International Search Report and Written Opinion issued on Jun. 4, 2024 by the International Searching Authority for International Patent Application No. PCT/KR2024/002804 (PCT/ISA/220, PCT/ISA/210, and PCT/ISA/237).

* cited by examiner

100

TRAINING PHASE

HANDNERF
200

BACKWARD PASS (2D SUPERVISION)
204

2D MULTI-VIEW CAPTURED IMAGES
208

FORWARD PASS
202

TRAINING GRASPS AND PAIRING IMAGES
206

```
class HandNeRFModel(nn.Module):
    def __init__(self, imgfeature_encoder, handpose_encoder, handobject_encoder, nerf, nerf_fine, mode):
        super(HandNeRFModel, self).__init__()
        self.mode = mode  # 'train', 'render_rotate', 'render_train', 'recon3d'
        # feature encoders
        self.feature_encoder = imgfeature_encoder
        self.handpose_encoder = handpose_encoder
        self.handmesh_encoder = handobject_encoder
        # nerf
        self.nerf = nerf
        self.nerf_fine = nerf_fine
        # loss weights
        self.bce_loss_weight = 0.1
        self.ce_loss_weight = 0.4 def forward(self, input_img, input_view_paramters, world_3d_data, rendering_rays, meta_info=None,
train_iter=-1):
        """
        input_img: (1, cfg.num_nput_views, cfg.input_img_shape[0], cfg.input_img_shape[1], 3)
        """
        """ Encoding image features """
        feature_map = self.feature_encoder(input_img) if self.feature_encoder is not None else None
        """ Forward to implicit function """
        if self.mode == 'recon3d':
            """ occupancy calcuation for world point """
            nerf = self.nerf_fine if 'fine' in cfg.nerf_mode else self.nerf
            # Extract surface information from density field and optionally generate mesh with
Marching Cube
            ret = get_alpha_value(nerf, self.handmesh_encoder, world_3d_data, input_view_paramters,
feature_map)
            return ret
        else:
            if self.mode == 'train':
                """ Filter out invalid rays before putting into the network during training """
                mask_at_box = rendering_rays['mask_at_box']  # (1, 1024);
                if mask_at_box.sum() == 0:  # batch with all invalid rays
                    return None
                else:
                    # k: 'rgb', 'fg_mask', 'ray_o', 'ray_d', 'near', 'far', 'mask_at_box'
                    # v: (1, 1024, 3), (1, 1024), (1, 1024, 3), (1, 1024, 3), (1, 1024), (1, 1024), (1, 1024)
                    for k, v in rendering_rays.items():
                        if k == 'mask_at_box':
                            continue
```

FIG. 6A

```
                new_v = []
                for batch_idx in range(v.shape[0]):
                    slice = v[batch_idx][mask_at_box[batch_idx]]
                    new_v.append(slice)
                new_v = torch.stack(new_v)  # (1, 1024 - ?, )
                rendering_rays[k] = new_v
        """ volume rendering for each pixel """
        n_batch, n_pixel = rendering_rays['ray_o'].shape[:2]
        chunk = cfg.chunk
        ret_list = []
        for i in range(0, n_pixel, chunk):
            start_idx = i
            end_idx = min(i + chunk, n_pixel)
            rendering_rays_chunk = {
                'ray_o': rendering_rays['ray_o'][:, start_idx:end_idx],
                'ray_d': rendering_rays['ray_d'][:, start_idx:end_idx],
                'near': rendering_rays['near'][:, start_idx:end_idx],
                'far': rendering_rays['far'][:, start_idx:end_idx]
            }
            pixel_value = get_pixel_value(self.nerf, self.nerf_fine, self.handpose_encoder,
self.handmesh_encoder,
                                rendering_rays_chunk, input_view_paramters, world_3d_data,
                                feature_map, self.mode, train_iter, computation_cost)
            ret_list.append(pixel_value)
        keys = ret_list[0].keys()
        ret = {k: torch.cat([r[k] for r in ret_list], dim=1) for k in keys}
        if self.mode == 'train':
            """ rendering loss """
            img_mse = calc_mse(
                ret['rgb_map'], rendering_rays['rgb'], mask=None)
            # rendering_rays['fg_mask'][:, :, None]  # (1, 1024, 1)
            mask_bce = calc_bce(
                ret['mask_map'], rendering_rays['fg_mask'][:, :, None])
            loss = {
                'img_mse': img_mse,
                'mask_bce': self.bce_loss_weight * mask_bce,
            }
            if 'semantic' in cfg.nerf_mode:
                semantic_ce = calc_semantic_ce(
                    ret['semantic_map'], rendering_rays['org_mask'].long())
                loss.update(
                    {'semantic_ce': self.ce_loss_weight * semantic_ce, })
            # Importance sampling; coarse & fine NeRFs
            if cfg.N_importance > 0 and self.nerf_fine != None:
                # Compute loss on coarse outputs too! Don't confuse:)
                # rendering_rays['fg_mask'][:, :, None]  # (1, 1024, 1)
```

FIG. 6B

```
img_mse = calc_mse(
    ret['rgb_map_coarse'], rendering_rays['rgb'], mask=None)
mask_bce = calc_bce(
    ret['mask_map_coarse'], rendering_rays['fg_mask'][:, :, None])
loss_coarse = {
    'img_mse_coarse': img_mse,
    'mask_bce_coarse': self.bce_loss_weight * mask_bce,
}
if 'semantic' in cfg.nerf_mode:
    semantic_ce = calc_semantic_ce(
        ret['semantic_map_coarse'], rendering_rays['org_mask'].long())
    loss_coarse.update(
        {'semantic_ce_coarse': self.ce_loss_weight * semantic_ce})
loss.update(loss_coarse)
    return loss
elif self.mode == 'render_train' or self.mode == 'render_rotate':
    return ret
```

FIG. 6C

SYSTEM AND METHOD FOR LEARNING TO SYNTHESIZE HAND-OBJECT INTERACTION SCENE

CROSS-REFERENCE TO RELATED APPLICATION

This application is based on and claims priority under 35 U.S.C. § 119 to U.S. Patent Application No. 63/460,995, filed on Apr. 21, 2023, in the United States Patent and Trademark Office, the disclosure of which is incorporated by reference herein in its entirety.

BACKGROUND

1. Field

The disclosure relates to a system and a method to understand an interaction of a hand and an object via a view synthesis from a single image. The disclosure relates to an interaction of three-dimensional (3D) hand-object reconstruction and implicit neural representations from sparse view images. The disclosure relates to learning the hand-object relationship from an estimated hand pose, which is, in turn, used to reconstruct the 3D object. The disclosure relates to a research of 3D reconstruction on hand-object interacting scenes.

2. Description of Related Art

When a co-robot, as an organic collaborator, attempts to grasp a mechanical tool handed over by a worker (giver) in an assembly line, the co-robot (receiver) is expected to safely receive the tool by not disturbing the giver's grasp, ideally with no robot-to-hand contact. To enable such organic collaboration, the receiver requires a predictive capability—the ability to see the grasping configuration of the tool and the hand from the giver's perspective, similar to the way humans take into account the giver's hand by mentally rotating the grasping scene to the giver's view. With this prediction, the receiver can plan its motion such that the interactions between the receiver and giver only occurs through the tool without a direct contact.

The applications of this ability are not limited to the robot handover tasks but also a wide range of emerging social augmented reality (AR)/virtual reality (VR) tasks that facilitate multi-user collaborations through real and virtual objects.

However, predicting a grasping scene from a giver's perspective is challenging due to complex interactions between the hand and the object, i.e., there are an infinite number of ways to hold the object. Further, the interactions, by nature, introduces self-occlusion, i.e., a large part of the object is occluded by the hand, preventing from estimating the underlying geometric pose of the object.

A key challenge of learning the correlation between the object lies in its quadratic complexity, i.e., the correlation between the hand pose and the object pose requires learning from every possible pair of hand and object points in 3D. With a small number of training data, the learned relationship is prone to overfitting.

SUMMARY

The disclosure is directed to a method for predicting a robot's interaction with an object, particularly predicting a grasping scene from any perspective, including the perspective of an object giver, such as a human involved in interactions with the robot, given a single image. The method of the disclosure, named 'HandNeRF,' explicitly learns the correlation between a hand pose and an object pose using an estimated three-dimensional (3D) hand mesh.

The disclosure may approximate a pairwise relationship between the hand pose and the object pose using a series of 3D convolutions that may effectively extract a meaningful representation by correlating spatially adjacent features, leading to modeling long-distance interactions. With the learned representation of hand-object interactions, the disclosure may predict the object density (occupancy), color, and semantics, which is validated by synthesizing arbitrary view images.

According to one aspect of the disclosure, a computer-implemented method includes: receiving an image that captures a hand and an object; estimating a three-dimensional (3D) mesh of the hand based on the image; estimating a two-dimensional (2D) segment of the object based on the image; estimating a 3D feature representing a correlation of the hand and the object, based on the 3D mesh of the hand and the 2D segment of the object; and generating a first set of output parameters for a first 3D query point, based on the 3D feature representing the correlation of the hand and the object.

According to another aspect of the disclosure, a computing system includes: one or more processors; one or more non-transitory computer-readable media that collectively store instructions that, when executed by the one or more processors, cause the computing system to perform: receive a single image about a hand and an object; receive the single image about the hand and the object; estimate a three-dimensional (3D) mesh of the hand; estimate a two-dimensional (2D) segment of the object; estimate a 3D feature about a correlation of the hand and the object, based on the 3D mesh of the hand and the 2D segment of the object; receive a first 3D query point and the 3D feature about the correlation of the hand and the object; generate a first set of output parameters for the first 3D query point, based on the 3D feature about the correlation of the hand and the object; and based on the first set of output parameters, generate one or more new images in one or more arbitrary views.

According to another aspect of the disclosure, a computer-implemented method, the method includes: receiving, by a feature extraction part, an input image comprising a hand and an object and a mesh data of the hand; generating, by the feature extraction part, first features about the hand and second features about the object; receiving, by a volume feature encoding part, the first features about the hand and the second features about the object; generating, by the volume feature encoding part, a hand-object interaction feature based on the first features about the hand and the second features about the object; receiving, by a neural field estimation part, the hand-object interaction feature and a pixel-aligned image feature; and generating, by the neural field estimation part, a set of output parameters based on the hand-object interaction feature and the pixel-aligned image feature.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A, 6B, and 6C show pseudocodes corresponding to features in some embodiments of the disclosure.

DETAILED DESCRIPTION

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

The computing system according to one or more embodiments may be one of various types of computing systems. In some embodiments of the disclosure, the computing systems may include a robot, a robotic arm, a portable communication device (e.g., a smartphone), a computer device, a portable multimedia device, a portable medical device, a camera, a wearable device, or a home appliance such as a refrigerator. The computing systems are not limited to those described above, in accordance with some other embodiments of the disclosure.

Figure 1:
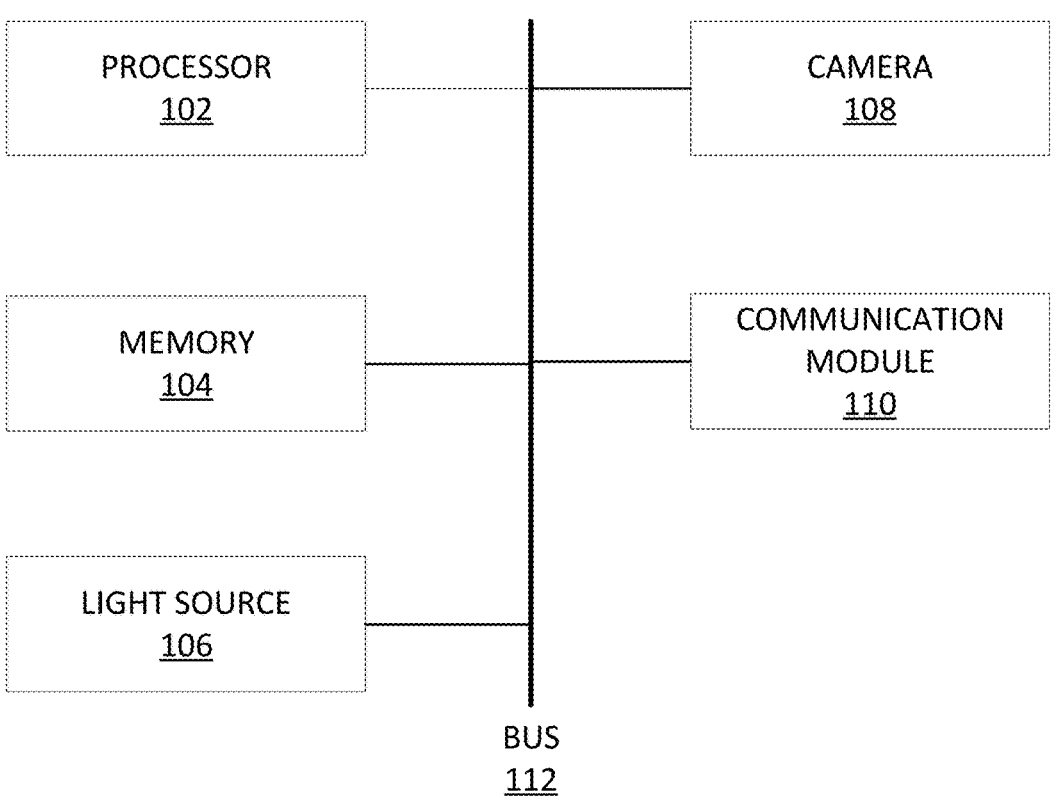
FIG. 1 illustrates example components of an computing system in accordance with embodiments of the disclosure.

FIG. 1 illustrates example components of the computing system in accordance with some embodiments of the disclosure.

As shown, the computing system 100 may include a processor 102, a memory (a non-transitory computer-readable media) 104, a light source 106, a camera 108, a communication module 110, and a bus 112.

In one embodiment, the processor 102 may be implemented in hardware, firmware, or a combination of hardware and software. The processor 102 may be a central processing unit (CPU), a graphics processing unit (GPU), an accelerated processing unit (APU), a neural processing unit (NPU), a tensor processing unit (TCU), a microprocessor, a microcontroller, a digital signal processor (DSP), a field-programmable gate array (FPGA), an application-specific integrated circuit (ASIC), or another type of processing component. In one embodiment, the processor 102 may include one or more processors capable of being programmed to perform a function.

In one embodiment, the memory 104 may include a random access memory (RAM), a read only memory (ROM), and/or another type of dynamic or static storage device (e.g., a flash memory, a magnetic memory, and/or an optical memory) that stores information and/or instructions for use by the processor 102. In one embodiment, the memory 104 may contain information and/or software related to the operation and use of the computing system 100. For example, the memory 104 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, or another type of non-transitory computer-readable medium, along with a corresponding drive.

In one embodiment, the light source 106 may be controlled by the processor 102 to illuminate an internal structure of the computing system. In one embodiment, the light source 106 may be controlled by the processor 102 to illuminate an object in close proximity to the computing system. In one embodiment, the processor 102 may turn on or turn off the light source 106.

In one embodiment, the camera 108 may include a lens or multiple lenses to capture an image of the object close proximity to the computing system. The camera 108 may be operatively connected with the processor 102, thus the processor 102 may control the camera 108, for example, based on software stored in the memory 104. In one embodiment, the camera 108 may produce signals or images that may be processed by the processor 102 and stored in the memory 104.

In one embodiment, the communication module 110 may include a transceiver-like component (e.g., a transceiver and/or a separate receiver and transmitter) that enables the computing system 100 to communicate with other devices, such as via a wired connection, a wireless connection, or a combination of wired and wireless connections. The communication module 110 may permit the computing system 100 to receive information from another device and/or provide information to another device. For example, the communication module 110 may include an Ethernet interface, an optical interface, a coaxial interface, an infrared interface, a radio frequency (RF) interface, a universal serial bus (USB) interface, a Wi-Fi interface, a cellular network interface, or the like. In one embodiment, the communication module 110 may be a communication 'interface' used to connect the computing system 100 with the other devices.

In one embodiment, the bus 112 may be a component that permits communication among the above-described components of the computing system 100.

The number and arrangement of components shown in FIG. 1 are provided as an example. In one embodiment, the computing system 100 may include additional components, fewer components, different components, or differently arranged components than those shown in FIG. 1. For example, although one processor 102 and one memory 104 are illustrated in FIG. 1 and described above, the processor 102 and the memory 104 may be replaced with two or more processors and two or more memories, respectively.

Additionally or alternatively, a set of components (e.g., one or more components) of the computing system 100 may perform one or more functions described as being performed by another set of components of the computing system 100.

The disclosure is directed to a method of understanding hand-object interactions via novel view synthesis from a single image. Due to a large number of configurations and self-occlusion in hand-object interactions, existing approaches show limited performance on predicting the scene appearance and geometry despite myriad potential applications including robotics handovers and social virtual presence. Inspired by grasping taxonomy, hand-object interactions may be highly structured, which allows predicting the object pose and appearance based on a hand configuration. A representation that explicitly encodes the correlation of the 3D hand and object features is used, which is, in turn, learned to predict their geometry in the form of an implicit function. A key challenge lies in the quadratic complexity of learning the hand-object interaction, i.e., every possible pair of hand and object points need to be correlated. Instead, the interaction is approximated through a series of 3D convolutions that can establish long-distance interactions. With the representation, the density (occupancy), color, and semantics are predicted and validated by projecting onto multiview training images. At testing time, a single view image is used to synthesize an arbitrary view image. The proposed method does not require 3D ground truth data for supervision.

Figure 2:
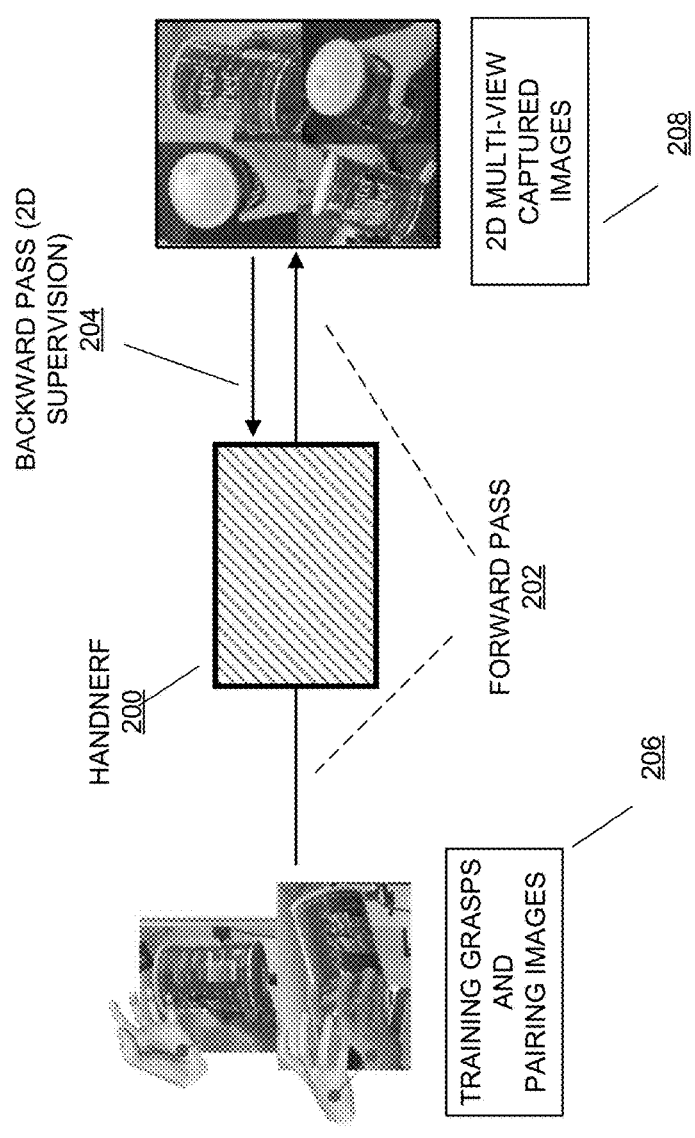
FIG. 2 illustrates a training phase of HandNeRF in accordance with some embodiments of the disclosure.

FIG. 2 illustrates a training phase of HandNeRF 200 in accordance with some embodiments of the disclosure. HandNeRF 200 may be included in or implemented with the processor 102, the memory 104, a combination of the processor 102 and the memory 104. In one embodiment, HandNeRF 200 may be included in or implemented with any other elements shown in FIG. 2 or their combinations.

In one embodiment, HandNeRF 200 has two operational paths, a forward pass 202 and a backward pass 204 for two-dimensional (2D) supervision. As an input, HandNeRF receives training grasps and pairing images 206 and uses them for training (correlation of the hand pose and the object pose). After the training, HandNeRF outputs 2D multi-view captured images 208 and the outputted 2D multi-view captured images 208 are fed back to HandNeRF via the backward pass 204, for further learning (e.g., adjusting or updating weights).

Figure 3:
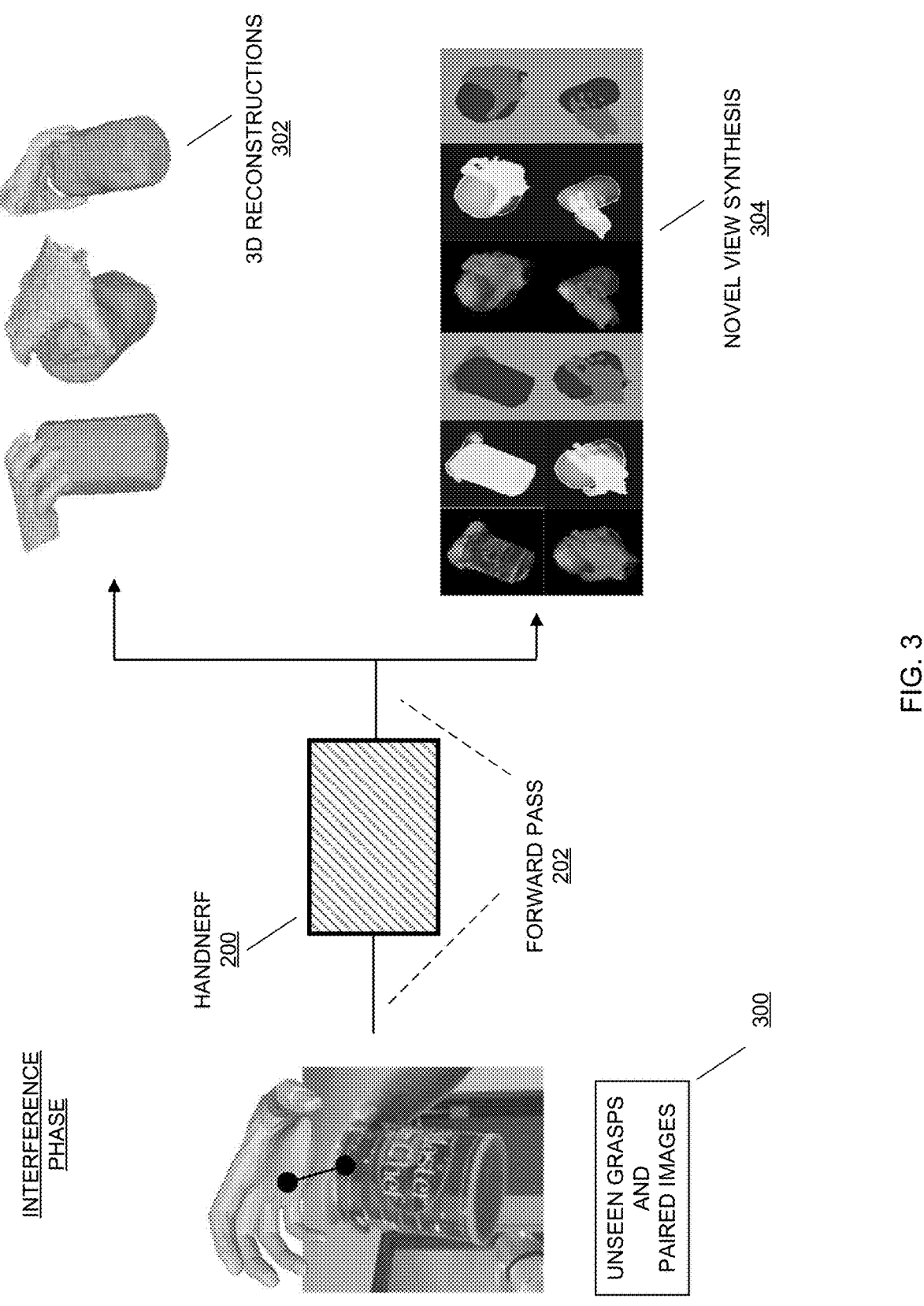
FIG. 3 illustrates an inference phase of HandNeRF in accordance with some embodiments of the disclosure.

FIG. 3 illustrates an inference phase of HandNeRF 200 in accordance with some embodiments of the disclosure. As shown in FIG. 3, HandNeRF 200, which is trained by the operations shown in FIG. 2 and described above, receives unseen grasps and paired images 300 via the forward pass 202. Then, HandNeRF 200 outputs 3D constructions of the hand and the object 302 and novel view synthesis of the hand and object 304 (e.g., object density, color, and semantic labels (hand, object, and background)).

The hand pose may be highly indicative of the object pose in a grasping scene. HandNeRF 200 is tailored to learn a representation for hand-object interactions based on the estimated 3D hand mesh. With the learned representation, HandNeRF 200 may estimate the novel view synthesis 304, such as object density, color, and semantic labels (hand, object, and background), which allows synthesizing an image in an arbitrary view. At testing time, a single image with a 3D hand mesh estimate may be used to reconstruct the hand-object interaction scene, such as the 3D reconstructions 302.

Because the hand-object interaction may be highly structured, it may be possible to reconstruct the 3D object pose based on an estimation of the 3D hand pose. This is represented as a problem of learning a representation of 3D hand-object interaction where the representation explicitly encodes the spatial relationship between them. Instead of 3D supervision, multiview supervision may be used where the rendered hand-object scene from the learned representation is matched to the corresponding captured image.

Modeling of the hand-object interaction is described below.

Consider a point on a 3D object, $x_o \in \mathbb{R}^3$ where its occupancy or density is $\sigma \in [0, 1]$, i.e., one if occupied, and zero otherwise. The problem of 3D reconstruction of the 3D object can be cast as learning a function that predicts the density given the location and associated 3D feature $f_o$:

$$f(x_o, f_o) = \sigma, \tag{1}$$

Here, $f$ is an implicit function of which level set defines the surface of the object, e.g., $f = \in$. Despite the success of representing objects and humans, Equation (1) has a limited capability to express an object with nontrivial interactions, e.g., the hand-object interaction. Equation (1) is extended by incorporating the interactions between the object and the hand. Consider a 3D hand mesh $\mathcal{M} = \{m_i\}_i$ that is made of a set of faces where $m_i$ is the $i^{th}$ face of the mesh. Each face in the mesh is associated with a 3D feature $f_h$. The density of the object is marginalized over the density predicted by the hand mesh:

$$f(x_o, f_o) = \sum_{x_h \in \mathcal{M}} f(x_o, f_o \mid x_h, f_h) f(x_h, f_h), \tag{2}$$

Here, $x_h$ is the centroid of the vertices of the face $m_i$, $f(x_o, f_o \mid x_h, f_h)$ is the conditional density given the hand pose and its feature. $f(x_h, f_h) = \{0,1\}$ is the hand occupancy provided by 3D hand mesh estimation. However, learning $f(x_o, f_o \mid x_h, f_h)$ is challenging due to the quadratic complexity of pairwise relationship, i.e., all possible pairs of hand and object points $(x_h, x_o)$ need to be considered. Instead, in the disclosure, an interaction feature $\mathcal{F}$, a correlation between $f_o$ and $f_h$ may be learned through a series of 3D convolutions:

$$\mathcal{F} = \phi_n \circ \ldots \circ \phi_1 \circ \mathcal{V}, \tag{3}$$

Here, $\mathcal{F} \in \mathbb{R}^{w \times h \times d \times m}$ is the volume of the interaction features with w width, h height, d depth, and $\phi_1, \ldots, \phi_n$ are the 3D convolutional filters. The interaction feature evaluated at the object point $\mathcal{F}|_{x_o}$ is expected to encode how a point in hand is contributed to predict the occupancy of a point in the object. The input to the 3D convolutional neural network (CNN) is $\mathcal{V} \in \mathbb{R}^{w \times h \times d \times n}$, which is the feature volume with the n feature dimension that includes both hand and object features:

$$\mathcal{V}_x = \begin{cases} f_h & \text{if } x \in \mathcal{M} \\ f_o & \text{if } \Pi_x \in \mathcal{O}, \\ 0 & \text{otherwise} \end{cases} \tag{4}$$

Here, $\mathcal{V}_x$ is the feature at x, $\Pi x$ is the camera projection of x to the input image, and $\mathcal{O}$ is the 2D input object mask. With the interaction feature, Equation (1) is extended to include the color, $c \in \mathbb{R}^3$, and semantic label $l \in [0,1]^L$ where L=3 is the number of semantic classes (e.g., hand, object, and background):

$$f(x_o, d, f_{2D}, \mathcal{F}|_{x_o}) = (\sigma, c, l), \tag{5}$$

Here, d is the rendering viewing direction, and $f_{2D}$ is the pixel-aligned image feature of $x_o$. The explicit representation of HandNeRF 200 is learned by a series of 3D convolutions that establish long-distance interaction, which allows successfully reconstructing the 3D geometry of the object. In HandNeRF 200, each pixel is rendered with its label by integrating the density field:

$$\hat{C}(p) = \sum_{j=1}^{N} T_i(1 - \exp(-\sigma(x_j)\delta_j))c(x_j), \qquad (6)$$

$$\hat{L}(p) = \sum_{j=1}^{N} T_i(1 - \exp(-\sigma(x_j)\delta_j))l(x_j), \qquad (7)$$

Here, $$T_j = \exp\left(-\sum_{k=1}^{j-1} \sigma(x_k)\delta_k\right) \qquad (10)$$

and C(p) is the expected RGB value at the pixel $p \in \mathbb{R}^2$ where $x_j$ is the $j^{th}$ sampled point along the 3D ray of p from the target view, i.e., the inverse projection of p. $\delta_i = \|x_{i+1} - x_i\|_2$ is the distance between adjacent sampled points.

An example implementation of HandNeRF 200 is described below.

Figure 4:
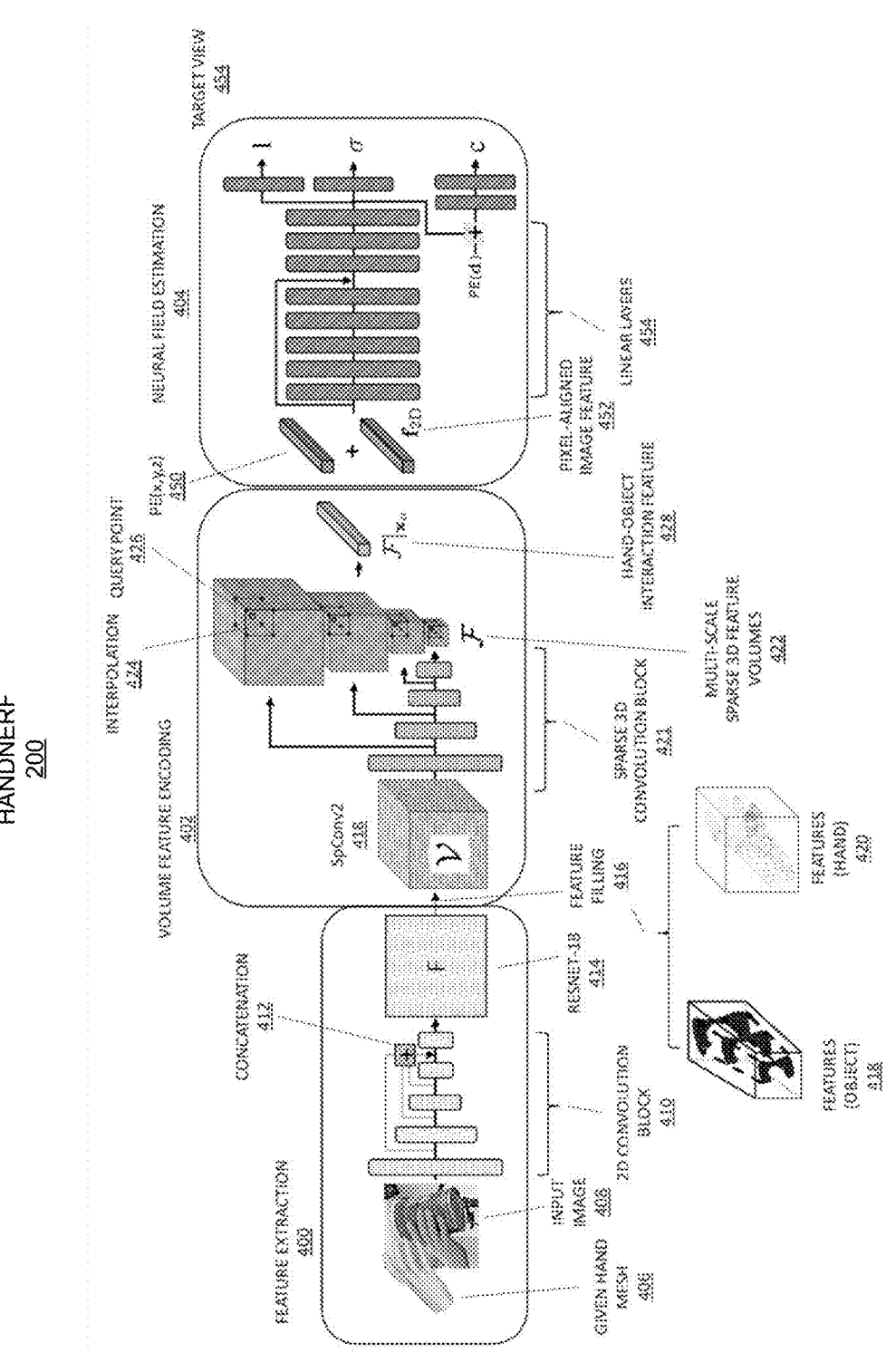
FIG. 4 illustrates an overall system (pipeline) of Hand-NeRF in accordance with some embodiments of the disclosure.

FIG. 4 illustrates an overall system (pipeline) of Hand-NeRF 200 in accordance with some embodiments of the disclosure. HandNeRF 200 has three parts: a feature extraction part 400, a volume feature encoding part 402, and a neural field estimation part 404.

The feature extraction part 400 may receive a given hand mesh 406 and an input image 408. The feature extraction part 400 may include a 2D convolution block 410 that includes a concatenation part 412. The feature extraction part 400 may also include ResNet-18 414. An output of the feature extraction part 400 may be a feature filling 416 that includes features about the object 418 and features about the hand 420.

The volume feature encoding part 402 may include SpConv2 418, a sparse 3D convolution block 421, and multi-scale sparse 3D feature volumes 422 that includes multiple interpolations 424 (shown as cubes) having each query point 426. An output of the multi-scale sparse 3D feature volumes 422 is a hand-object interaction feature 428.

The neural field estimation part 404 may receive the hand-object interaction feature 428 as PE (x,y,z) 450. Additionally, the neural field estimation part 404 may receive a pixel-aligned image feature 452. By using layers 454, based on PE (x,y,z) 450 and the pixel-aligned image feature 452, neural field estimation part 404 generate an output (a target view 454).

In other words, HandNeRF 200 takes a single RGB image (the input image 408) and an estimated hand mesh (the given hand mesh 406) from the signal RGB image as input and predicts the volume density, color radiance, and semantic label (the target view 454) of each query point 426 in a neural radiance field. HandNeRF 200 may include ResNet-18 414 that extracts image features (the features about the object 418 and the features about the hand 420), SpConv2 418 that correlates the features about the object 418 and the features about the hand 420 with the sparse 3D convolution block 421, and the linear layers 454 for output predictions.

The representation of the hand-object interaction is learned by minimizing the following loss:

$$\mathcal{L} = \sum_{p \in \mathcal{R}} (\|\hat{C}(p) - C(p)\|_2^2 - \sum_{i=1}^{L} L_i(p)\log(\hat{L}_i(p))) \qquad (8)$$

Here, $\mathcal{R}$ is a set of pixels in multiview images, $\hat{C}(p)$ and C(p) are the predicted and ground truth color of pixel p, respectively, and $\hat{L}_i(p)$ and $L_i(p)$ are the predicted and ground truth semantic label at pixel p. HandNeRF 200 may be designed to learn the hand-object interactions as shown in FIG. 4. HandNeRF may include ResNet-18 414 for image feature, SpConv2 418 for sparse 3D convolutions, and the linear layers 454 for output predictions. In the training phase (as shown in FIG. 2), HandNeRF 200, from a single view, predicts a neural radiance field by learning the volume of the hand-object interaction features, which is validated by projecting onto different views. In the inference phase (as shown in FIG. 3), the 3D hand mesh is estimated by an off-the-shelf 3D hand mesh estimator from a single view.

Input Features are described below.

A 2D image feature extracted from the input image 408 is lifted to a point in the 3D volume, for a 3D hand feature 420 and a 3D object feature 418 in Equation (4). The 3D hand feature 420 is made of three components: $f_h = [h^T\phi(\overline{m}_i)^T\psi(i)^T]^T$. h encodes the visual context of hand-object interaction that is obtained from the 2D image feature at the projection of the centroid of the $i^{th}$ face, $\overline{m}_i$ in the 3D hand mesh. $\phi(\overline{m}_i)$ is a positional encoding of the centroid, and $\psi(i)$ is the positional encoding of the vertex index. Similarly, an object feature, i.e., $f_o = [o^T\phi(x_o)^T 0^T]^T$ is extracted, where o is the 2D image feature at the projection of $x_o$.

3D CNN Design is described below.

The 3D hand feature $f_h$ (418) and 3D object feature $f_o$(420) are correlated with the sparse 3D CNN (420) that takes the feature volume V as input, to learn an interaction feature $\mathcal{F}$. V rasterizes 3D points in the neural radiance field with a voxel size of, for example, 5 mm×5 mm×5 mm. Before the rasterization, 3D coordinates of object points are perturbated by a random Gaussian noise, during training, for augmentation. The sparse 3D CNN (420) may include multiple sparse 3D convolutional layers and down-sampling layers. The sparse 3D CNN (420) may produce multi-scale feature volumes (422), which conceptually add up to the interaction feature volume $\mathcal{F}$ by concatenation along the feature channel dimension.

In some embodiments, the multiscale feature volumes (422) may be left separated and the interaction feature $\mathcal{F}|_x$ of a query point x (426) per volume may be extracted. A hand feature evaluated at a hand vertex $\mathcal{F}|_{x_h}$ is used to fill empty voxel features in $\mathcal{F}$. While most voxels outside of the 3D hand surface and 2D object mask remain empty even after 3D CNN processing, their features could still contribute to the volume rendering of each pixel as long as they lie on the rendering view's ray. If they are empty during the initial stage of training, optimization of weights of NeRF linear layers (454) may be adversely affected.

Figure 5:
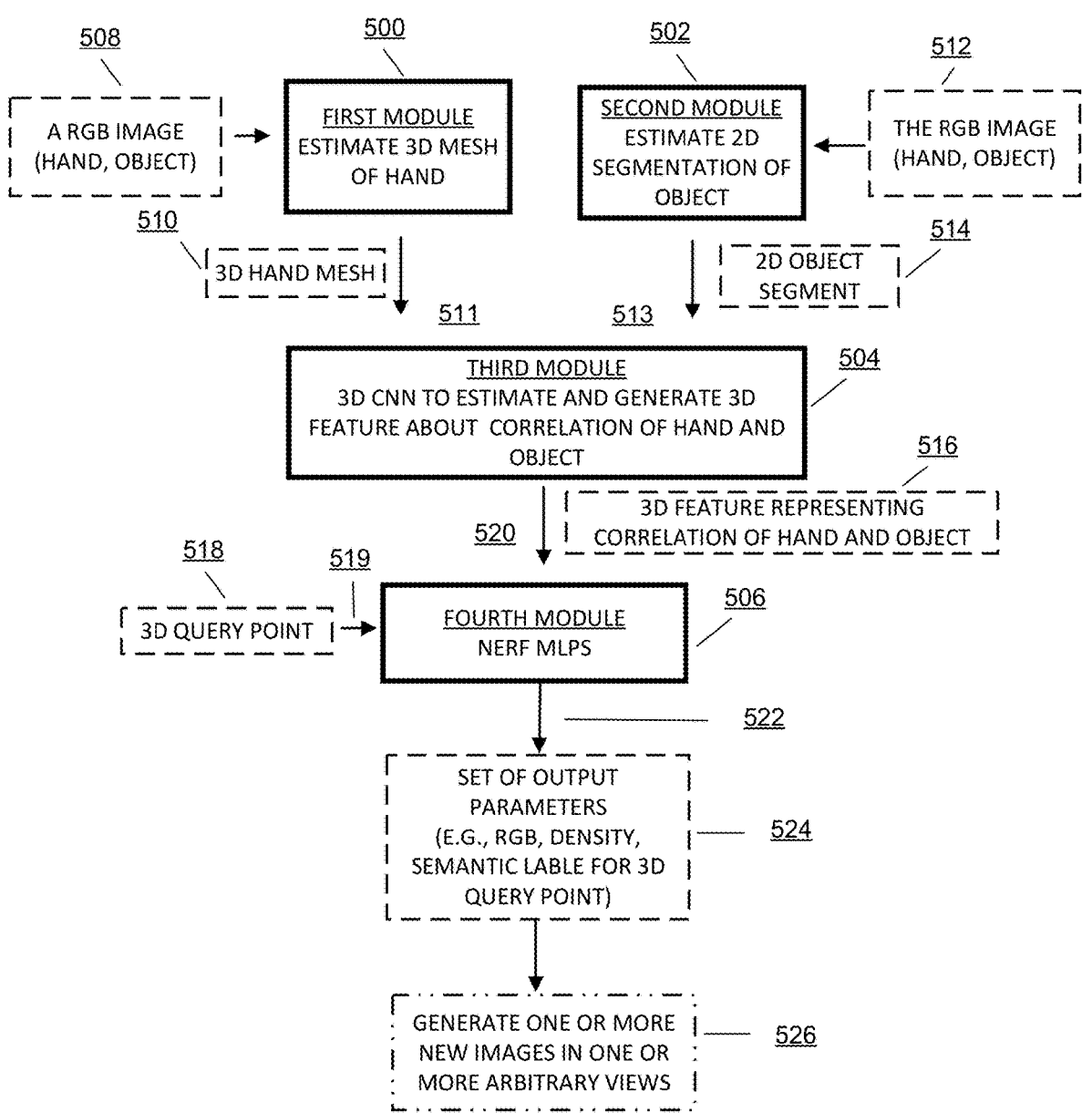
FIG. 5 illustrates a flow chart in accordance with some embodiments of the disclosure.

FIG. 5 illustrates a flow chart of operations performed by HandNeRF 200 in accordance with some embodiments of the disclosure. In FIG. 5, HandNeRF 200 includes a first module 500, a second module 502, a third module 504, and a fourth module 506. The dash-lined box of FIG. 5 indicates an input value (or parameter) or an output value (or parameter).

At operation 508, the first module 500 may receive an image that captures a hand and an object. At operation 510, based on the received single image, the first module 500 may estimate a 3D mesh of the hand.

At operation 512, the second module 502 may receive the single image about the hand and the object. At operation 514, based on the received single image, the second module 502 may estimate a 2D segment of the object.

At operation 511, the third module 504 may receive the 3D mesh of the hand from the first module 500. At operation 513, the third module 504 may receive the 2D segment of the object from the second module 502.

At operation 516, the third module 504 may estimate a 3D feature (e.g., the hand-object interaction feature 428) about a correlation of the hand and the object, based on the 3D mesh of the hand and the 2D segment of the object. The correlation of the hand and the object may be explained herein. There are general patterns of grasping, which depend on the geometry of a held object or the part in contact. For example, to grab a thick cylindrical object like a cup, a curved grasp pose with all fingers engaged is used, while to grab a flat or narrow object like a pen, only thumb and index or middle fingers are used.

At operation 519, the fourth module 506 may receive a first 3D query point 518. A 3D query point is a point in the target 3D space of the hand-object interaction scene to be represented. HandNeRF predicts density, color radiance, and semantic label of all 3D points in the target 3D space.

At operation 520, the fourth module 506 may receive the 3D feature about the correlation of the hand and the object, from the third module 504.

At operation 522, the fourth module 506 may generate a first set of output parameters 524 for the first 3D query point, based on the 3D feature about the correlation of the hand and the object.

At operation 524, based on the first set of output parameters, one or more new images (in one or more arbitrary views) are synthesized.

In one embodiment, the single image about the hand and the object may be a single Red/Green/Blue (RGB) image about the hand and the object.

In one embodiment, the third module 504 may be a 3D convolutional neural network (CNN).

In one embodiment, the fourth module 506 may be a module of neural radiance field (NeRF) multilayer perceptrons (MLPS).

In one embodiment, the first set of output parameters for the first 3D query point may include at least one of a RGB, a density, or a semantic label.

In one embodiment, the fourth module 506 may further receive a second 3D query point, and the fourth module 506 may generate a second set of output parameters for the second 3D query point, based on the 3D feature about the correlation of the hand and the object.

In one embodiment, the second set of output parameters for the second 3D query point comprises at least one of a RGB, a density, or a semantic label.

HandNeRF 200 of the disclosure outperforms relate art's baseline methods in all metrics, regardless of use of ground truth 3D hand meshes. Examples of the related art's baseline methods are PixelNeRF (Alex Yu, Vickie Ye, Matthew Tancik, and Angjoo Kanazawa. pixelnerf: Neural radiance fields from one or few images. In CVPR, 2021), IHOI (Yufei Ye, Abhinav Gupta, and Shubham Tulsiani. What's in your hands? 3d reconstruction of generic objects in hands. In CVPR, 2022), and MonoNHR (Hongsuk Choi, Gyeongsik Moon, Matthieu Armando, Vincent Leroy, Kyoung Mu Lee, and Gregory Rogez. Mononhr: Monocular neural human renderer. In 3DV, 2022) that take as input a single view image and outputs the 3D geometry and associated rendered images. PixelNeRF estimates a neural radiance field using pixel-aligned image features, which allows encoding a spatial context where the scene can be predicted by a single view. IHOI predicts the 3D geometry in the form of a sign distance field (SDF) supervised by 3D ground truth of objects. All baselines of the NeRF variants are trained from scratch to include semantic labels for hand object segmentation.

For example, HandNeRF 200 achieves approximately 1.5 times higher F-scores and significantly lower CD for 3D object reconstruction than that of PixelNeRF and MonoNHR. Although MonoNHR also exploits a 3D hand mesh as a 3D feature, MonoNHR fails to recover high quality object geometry due to lack of an explicit representation of hand-object interactions.

FIGS. 6A, 6B, and 6C show pseudocodes corresponding to features in some embodiments of the disclosure. In FIGS. 6A, 6B, and 6C, comments about some blocks of the pseudocodes are added in bold, for example, "#feature encoders," "#nerf", and """"Encoding image features""""".

The disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

According to one or more embodiments, in a non-volatile storage medium storing instructions, the instructions may be configured to, when executed by at least one processor, cause the at least one processor to perform at least one operation. The at least one operation may include displaying an application screen of a running application on a display, identifying a data input field included in the application screen, identifying a data type corresponding to the data input field, displaying at least one external computing system, around the computing system, capable of providing data corresponding to the identified data type, receiving data corresponding to the identified data type from an external computing system selected from among the at least one external computing system through a communication module, and entering the received data into the data input field.

The embodiments of the disclosure described in the present specification and the drawings are only presented as specific examples to easily explain the technical content according to the embodiments of the disclosure and help understanding of the embodiments of the disclosure, not intended to limit the scope of the embodiments of the disclosure. Therefore, the scope of one or more embodiments of the disclosure should be construed as encompassing all changes or modifications derived from the technical spirit of one or more embodiments of the disclosure in addition to the embodiments disclosed herein.

What is claimed is:

1. A computer-implemented method comprising:
receiving an image that captures a hand and an object;
estimating a three-dimensional (3D) mesh of the hand based on the image;
estimating a two-dimensional (2D) segment of the object based on the image;

estimating a 3D feature representing a correlation of the hand and the object, based on the 3D mesh of the hand and the 2D segment of the object; and generating a first set of output parameters for a first 3D query point in a neural radiance field (NeRF), based on the 3D feature representing the correlation of the hand and the object,
wherein the generating of the first set of output parameters are performed by NeRF multilayer perceptrons (MLPS).

2. The method of claim 1, wherein the image is an Red/Green/Blue (RGB) image.

3. The method of claim 1, wherein the method further comprises, based on the first set of output parameters, generating one or more new images in one or more arbitrary views.

4. The method of claim 1, wherein the estimating of the 3D feature is performed by a 3D convolutional neural network (CNN).

5. The method of claim 4, the 3D CNN is trained with training grasps and pairing images.

6. The method of claim 1, wherein the first set of output parameters for the first 3D query point comprises at least one of a RGB, a density, or a semantic label.

7. The method of claim 1, further comprising:
receiving, by a fourth module, a second 3D query point; and
generating, by the fourth module, a second set of output parameters for the second 3D query point, based on the 3D feature about the correlation of the hand and the object.

8. The method of claim 7, wherein the second set of output parameters for the second 3D query point comprises at least one of a RGB, a density, or a semantic label.

9. A computing system comprising:
one or more processors;
one or more non-transitory computer-readable media that collectively store instructions that, when executed by the one or more processors, cause the computing system to perform:
receive a single image about a hand and an object;
receive the single image about the hand and the object;
estimate a three-dimensional (3D) mesh of the hand;
estimate a two-dimensional (2D) segment of the object;
estimate a 3D feature about a correlation of the hand and the object, based on the 3D mesh of the hand and the 2D segment of the object;
receive a first 3D query point and the 3D feature about the correlation of the hand and the object;
generate, by neural radiance field (NeRF) multilayer perceptrons (MLPS), a first set of output parameters for the first 3D query point in a NeRF, based on the 3D feature about the correlation of the hand and the object; and
based on the first set of output parameters, generate one or more new images in one or more arbitrary views.

10. The computing system of claim 9, wherein the single image about the hand and the object is a single Red/Green/Blue (RGB) image about the hand and the object.

11. The computing system of claim 9, wherein the third module is a 3D convolutional neural network (CNN).

12. The computing system of claim 11, the 3D CNN is trained with training grasps and pairing images.

13. The computing system of claim 9, wherein the first set of output parameters for the first 3D query point comprises at least one of a RGB, a density, or a semantic label.

14. The computing system of claim 9, wherein the one or more non-transitory computer-readable media that collectively store the instructions that, when executed by the one or more processors, further cause the computing system to perform:

receive a second 3D query point; and generate a second set of output parameters for the second 3D query point, based on the 3D feature about the correlation of the hand and the object.

15. The computing system of claim 14, wherein the second set of output parameters for the second 3D query point comprises at least one of a RGB, a density, or a semantic label.

16. The computing system of claim 9, wherein the computing system is a robot or a robot related electronic device.

17. A computer-implemented method, the method comprising:

receiving, by a feature extraction part, an input image comprising a hand and an object and a mesh data of the hand;

generating, by the feature extraction part, first features about the hand and second features about the object;

receiving, by a volume feature encoding part, the first features about the hand and the second features about the object;

generating, by the volume feature encoding part, a hand-object interaction feature based on the first features about the hand and the second features about the object;

receiving, by a neural field estimation part, the hand-object interaction feature and a pixel-aligned image feature; and generating, by the neural field estimation part, a set of output parameters for a three-dimensional (3D) query point in a neural radiance field (NeRF), based on the hand-object interaction feature and the pixel-aligned image feature, wherein the generating of the set of output parameters are performed by NeRF multilayer perceptrons (MLPS).

18. The computer-implemented method of claim 17, wherein the set of output parameters comprises at least one of a RGB, a density, or a semantic label.

19. The computer-implemented method of claim 17, wherein the neural field estimation part is trained with training grasps and pairing images.

* * * * *